United States Patent
Ward et al.

(10) Patent No.: US 10,862,915 B2
(45) Date of Patent: Dec. 8, 2020

(54) EXCEPTION REMEDIATION LOGIC ROUTING AND SUPPRESSION PLATFORM

(71) Applicant: Bank of America Corporation, Charlotte, NC (US)

(72) Inventors: Julia A. Ward, Charlotte, NC (US); Mackenzie Smith Durnovich, Charlotte, NC (US); Jessica Kay Aleshire, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 365 days.

(21) Appl. No.: 15/889,949

(22) Filed: Feb. 6, 2018

(65) Prior Publication Data

US 2019/0245881 A1 Aug. 8, 2019

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
CPC .............................. H04L 63/1433; H04L 63/20
See application file for complete search history.

(56) References Cited

U.S. PATENT DOCUMENTS

| | | |
|---|---|---|
| 6,711,571 B2 | 3/2004 | Putzolu |
| 7,000,247 B2 | 2/2006 | Banzhof |
| 7,448,066 B2 | 11/2008 | Birk et al. |
| 7,529,981 B2 | 5/2009 | Childress et al. |
| 7,607,164 B2 | 10/2009 | Vasishth et al. |
| 7,665,119 B2 | 2/2010 | Bezilla et al. |
| 7,668,947 B2 | 2/2010 | Hutchinson et al. |
| 7,698,275 B2 | 4/2010 | O'Brien et al. |
| 7,698,391 B2 | 4/2010 | Paliwal et al. |
| 7,711,683 B1 | 5/2010 | Watanabe et al. |
| 7,761,920 B2 | 7/2010 | Bezilla et al. |
| 7,774,848 B2 | 8/2010 | D'Mello et al. |
| 7,818,788 B2 | 10/2010 | Meier |
| 7,962,696 B2 | 6/2011 | Steely, Jr. et al. |
| 7,962,960 B2 | 6/2011 | Fudge |
| 7,992,033 B2 | 8/2011 | Childress et al. |

(Continued)

*Primary Examiner* — Lynn D Feild
*Assistant Examiner* — Abdullah Almamun
(74) *Attorney, Agent, or Firm* — Michael A. Springs; Moore & Van Allen PLLC; Nicholas C. Russell

(57) ABSTRACT

Embodiments of the present invention provide a system for exception remediation logic routing and suppression. In particular, the system may identify a vulnerability of a network component as well as additional information like an associated vulnerability category. Next, an original remediation procedure associated with the vulnerability of the network component is identified, including an expected timeframe for completing the original remediation procedure. A determination is then made regarding an expected timeframe for completing the original remediation and how that expected timeframe will not be met in time. A remediation exception procedure is then generated based on the vulnerability, the vulnerability category, the primary user, or a line of business associated with the primary user. This remediation exception procedure comprises an approval to implement the original remediation procedure outside of the expected timeframe, and may include additional restrictions to the network component.

17 Claims, 3 Drawing Sheets

(56) References Cited

U.S. PATENT DOCUMENTS

| | | | |
|---|---|---|---|
| 8,224,937 B2 | 7/2012 | Childress et al. | |
| 8,291,093 B2 | 10/2012 | Choe | |
| 8,341,691 B2 | 12/2012 | Bezilla et al. | |
| 8,375,113 B2 | 2/2013 | Sinn et al. | |
| 8,549,626 B1* | 10/2013 | Glick | G06F 21/566 |
| | | | 709/203 |
| 8,561,134 B2 | 10/2013 | Bezilla et al. | |
| 8,561,175 B2 | 10/2013 | Williams et al. | |
| 8,590,047 B2* | 11/2013 | Hoyt | G06Q 10/06 |
| | | | 726/25 |
| 8,613,080 B2 | 12/2013 | Wysopal et al. | |
| 8,769,412 B2 | 7/2014 | Gill et al. | |
| 8,776,170 B2 | 7/2014 | Bezilla et al. | |
| 8,924,577 B2 | 12/2014 | Choe | |
| 8,984,586 B2 | 3/2015 | Bezilla et al. | |
| 8,984,643 B1 | 3/2015 | Krisher et al. | |
| 9,100,431 B2 | 8/2015 | Oliphant et al. | |
| 9,154,523 B2 | 10/2015 | Bezilla et al. | |
| 9,253,202 B2 | 2/2016 | Thakur | |
| 9,270,695 B2 | 2/2016 | Roytman et al. | |
| 9,436,820 B1 | 9/2016 | Gleichauf et al. | |
| 9,467,464 B2 | 10/2016 | Gula et al. | |
| 9,483,281 B2* | 11/2016 | Bonczkowski | G06F 8/61 |
| 9,706,410 B2 | 7/2017 | Sreenivas et al. | |
| 9,727,728 B2 | 8/2017 | Avrahami et al. | |
| 2005/0044418 A1* | 2/2005 | Miliefsky | H04L 63/0272 |
| | | | 726/4 |
| 2006/0010497 A1* | 1/2006 | O'Brien | G06Q 10/10 |
| | | | 726/26 |
| 2006/0101517 A1* | 5/2006 | Banzhof | G06F 21/577 |
| | | | 726/25 |
| 2006/0191012 A1* | 8/2006 | Banzhof | G06F 21/577 |
| | | | 726/25 |
| 2010/0130178 A1* | 5/2010 | Bennett | H04L 63/30 |
| | | | 455/414.1 |
| 2010/0216429 A1* | 8/2010 | Mahajan | G06F 21/6245 |
| | | | 455/411 |
| 2011/0225275 A1* | 9/2011 | Shah | G06F 9/44505 |
| | | | 709/223 |
| 2012/0046985 A1* | 2/2012 | Richter | G06Q 10/06 |
| | | | 705/7.14 |
| 2012/0174230 A1* | 7/2012 | Hoyt | G06Q 10/06 |
| | | | 726/25 |
| 2013/0091534 A1* | 4/2013 | Gilde | H04L 63/0227 |
| | | | 726/1 |
| 2014/0331326 A1* | 11/2014 | Thakur | H04L 63/1433 |
| | | | 726/25 |
| 2015/0281287 A1 | 10/2015 | Gill et al. | |
| 2017/0220808 A1 | 8/2017 | Schmidt et al. | |
| 2017/0279799 A1* | 9/2017 | Baltzer | H04L 63/0861 |
| 2018/0144139 A1* | 5/2018 | Cheng | G06F 21/577 |
| 2019/0087832 A1* | 3/2019 | Mercury | G06F 16/2379 |
| 2019/0098028 A1* | 3/2019 | Ektare | H04L 43/10 |

* cited by examiner

EXCEPTION REMEDIATION LOGIC ROUTING AND SUPPRESSION PLATFORM

FIELD

The present invention relates to exception remediation logic routing and suppression platforms.

BACKGROUND

Remediation procedures configured to resolve or otherwise mitigate vulnerabilities of a network component are helpful in enabling the execution of appropriate action steps to address the vulnerability within a particular timeframe that may be established based on regulatory standards. However, in some instances, the entirety of the original remediation procedure cannot be performed within the particular timeframe. Normally, this would trigger alerts, follow-up communication, or other administrative and network security prompts and interactions. A system that identifies when a remediation procedure will not meet the particular timeframe prior to the timeframe expiring, and/or automatically performing technical adjustments to the network component to permit the completion of a remediation exception procedure at some point beyond the original timeframe would reduce unnecessary or distracting alert communications and allow for the resolution of the network component in a timely manner.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved monitoring and management of network devices, including determining the vulnerabilities of network devices (e.g., hardware, applications, and/or compliance policy vulnerabilities) and taking consequence actions based on the vulnerabilities (e.g., handling exceptions for the network devices, reporting exceptions, as well as taking suspending, blocking, removal, the network devices, or the like). The present invention provides improved security for an organization by providing improved information collection and control over the network devices of the organization. Additionally, the present invention provides improved efficiency in monitoring and taking actions with respect to network devices of an organization.

Embodiments of the present invention address the above needs and/or achieve other advantages by providing apparatuses (e.g., a system, computer program product and/or other devices) and methods for exception remediation logic routing and suppression. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve identifying a vulnerability of a network component, a primary user associated with the network component, and an original remediation procedure associated with the vulnerability of the network component, including an expected timeframe for completing the original remediation procedure. The system may then determine that the expected timeframe for completing the original remediation procedure will not be met. In some embodiments, the system may identify a vulnerability classification associated with the vulnerability of the network component. The system may then generate a remediation exception procedure based on the vulnerability, the vulnerability classification, the primary user, or a line of business associated with the primary user, wherein the remediation exception procedure comprises an approval to implement the original remediation procedure outside of the expected timeframe for completing the original remediation procedure.

In some embodiments of the system, the expected timeframe for completing the original remediation procedure is determined based on a vulnerability classification of the vulnerability of the network component. Additionally or alternatively, the expected timeframe for completing the original remediation procedure may be determined based on a service level agreement with a third party.

Additionally, in some embodiments of the system, determining that the expected timeframe for completing the original remediation procedure will not be met comprises receiving an exception request from the primary user that includes an indication that the expected timeframe for completing at least a portion of the original remediation procedure will not be met.

The remediation exception procedure of the system may comprise removing the network component from the enterprise network until the original remediation procedure has been successfully implemented.

Additionally or alternatively, the remediation exception procedure of the system may comprise the original remediation procedure and one or more additional remediation procedure steps that must be executed within an updated remediation timeframe.

In some embodiments, the system may further be configured to establish a change freeze for the network component that prevents execution of one or more actions outside of a scope of the remediation exception procedure until the remediation exception procedure has been successfully implemented.

Finally, in some embodiments, the system may be configured to transmit the remediation exception procedure to a computing device of the primary user.

To the accomplishment the foregoing and the related ends, the one or more embodiments comprise the features hereinafter described and particularly pointed out in the claims.

The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
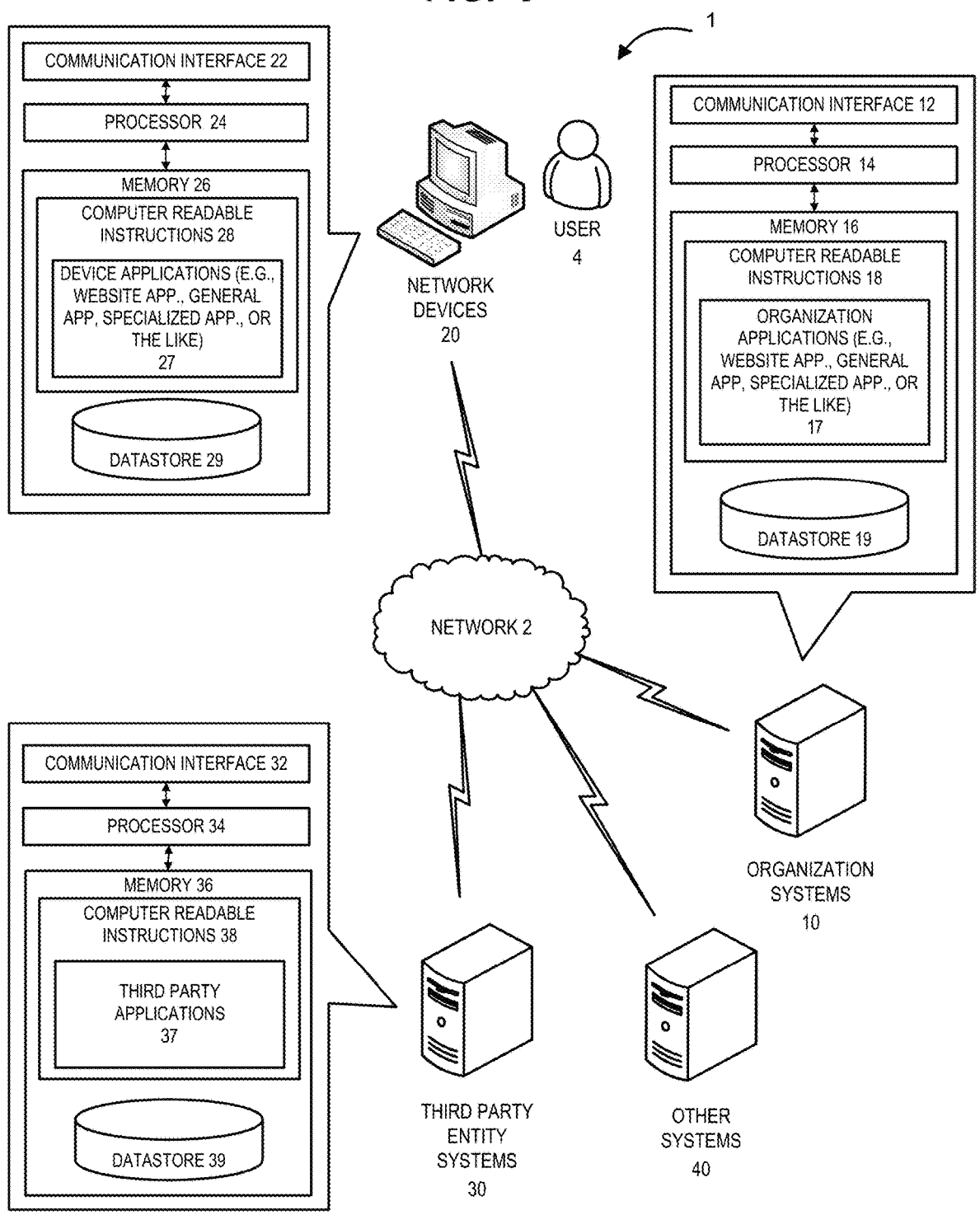
Figure 2:
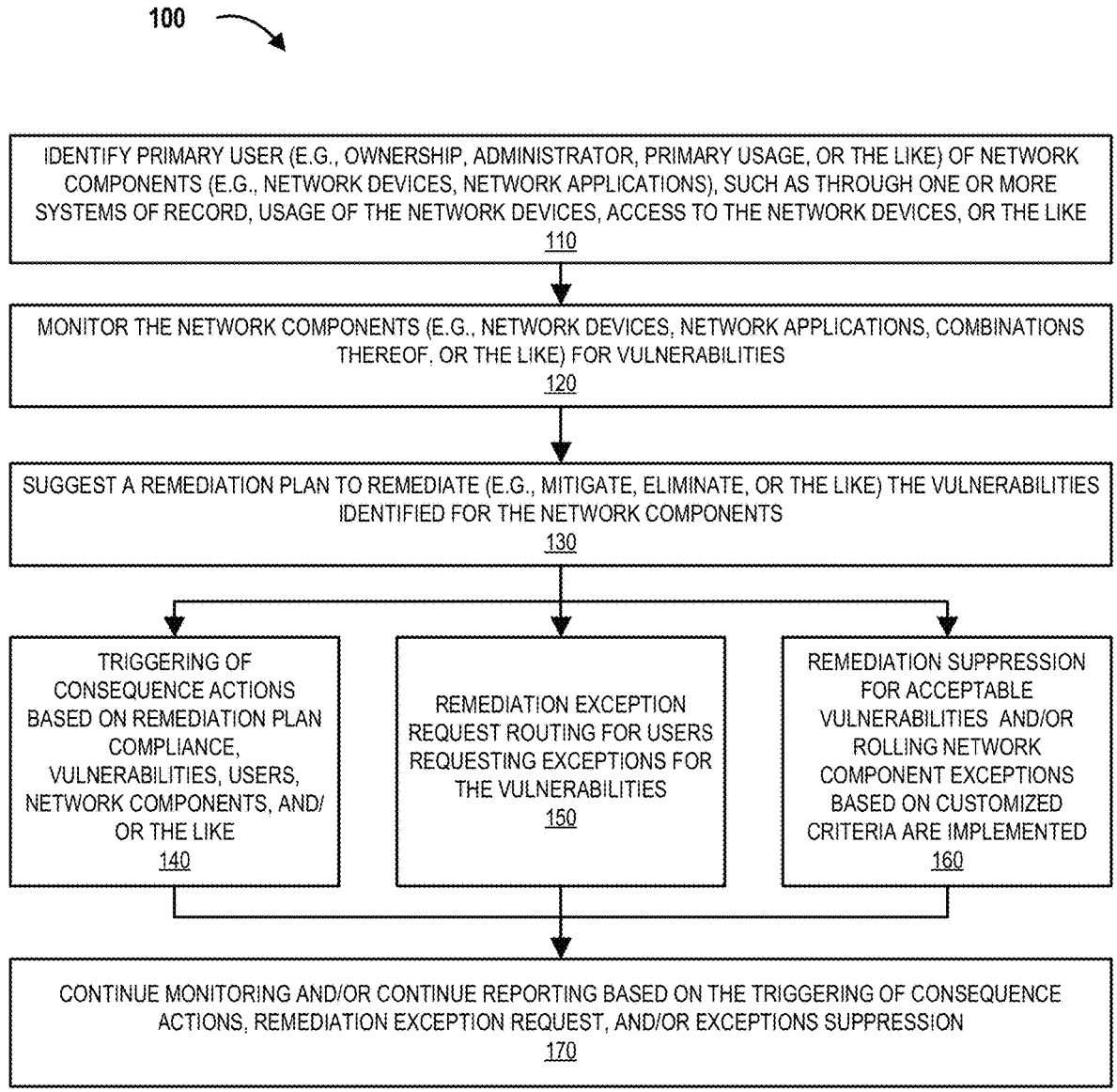
Figure 3:
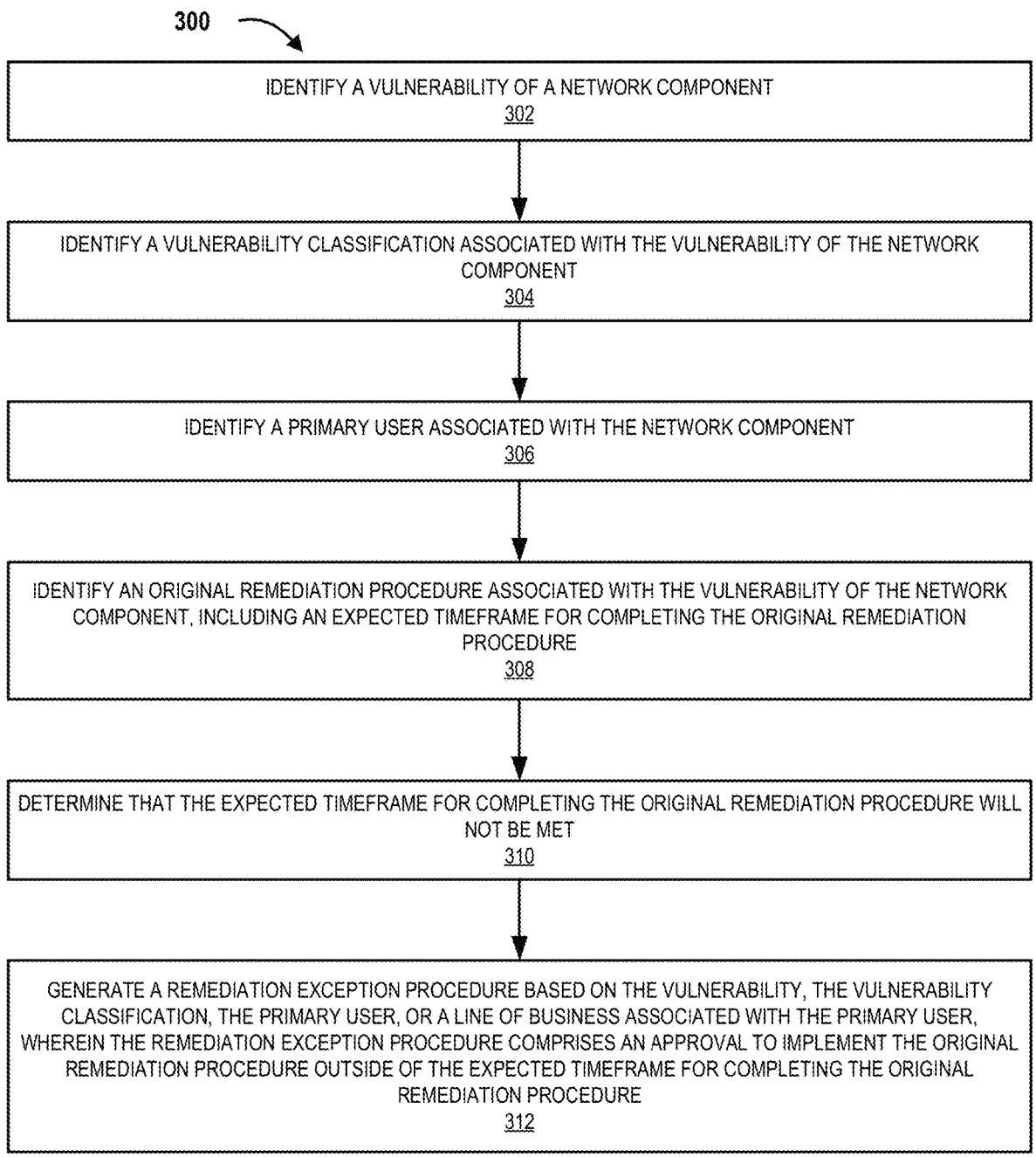

Having thus described embodiments of the invention in general terms, reference will now be made to the accompanying drawings, and wherein:

FIG. 1 illustrates a block diagram of a network device vulnerability system environment, in accordance with one or more embodiments of the invention; and FIG. 2 illustrates a high level process flow for determining and deaccessioning for network device vulnerabilities, in accordance with one or more embodiments of the invention; and FIG. 3 illustrates a process flowchart for exception remediation logic routing and suppression, in accordance with one or more embodiment of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that monitor and manage network devices, including determining the vulnerabilities of network devices (e.g., hardware, applications, and/or compliance policy vulnerabilities) and taking consequence actions based on the vulnerabilities (e.g., handling exceptions for the network devices, reporting exceptions, as well as suspending, blocking, removal, the network devices, or the like). In particular, systems, methods, and computer program products are disclosed for exception remediation logic routing and suppression.

In general, the system identifies a vulnerability of a network component within a network of devices. In identifying the vulnerability, or subsequent to identifying the vulnerability, the system may identify a vulnerability category, vulnerability type, vulnerability ranking, or other information about the vulnerability. A primary user (or an owner or a business group) that is associated with the network component and/or the vulnerability can be identified. Communication with this primary user can be conducted to receive information about the vulnerability and/or the network component, and to instruct the primary user to perform one or more actions related to the network component and/or the vulnerability.

An original remediation procedure associated with the vulnerability of the network component can be identified, where the original remediation procedure includes one or more remediation procedure steps that can be implemented within an original remediation timeframe to resolve the vulnerability in a timely manner. The original remediation timeframe may be determined or assigned based on a business rule or government rule or regulation for how long a particular vulnerability or vulnerability category can be present before the network component is not compliant.

A determination is then made regarding whether the original remediation procedure will be completed within the original remediation timeframe. If the original remediation procedure likely will be completed in time, the system may take no actions in altering the original remediation procedure or remediation deadline. However, if the original remediation procedure likely will not be completed in time, the system may generate a remediation exception procedure that is configured to resolve the vulnerability at some time point that is beyond the original remediation timeframe (e.g., an updated remediation timeframe or a remediation exception timeframe). The remediation exception procedure may be based on the vulnerability, the vulnerability category, the primary user, a line of business associated with the primary user, or the like. The remediation exception procedure may involve taking the network component out of a production environment, restricting the types of actions that may be performed on the network component, restricting which users can perform actions on the network component, and the like. In this way, the system may provide a means for addressing a vulnerability after an initial deadline to resolve the vulnerability while remaining within a margin of error or without entering a non-compliant state for the network component without triggering unnecessary alerts or communications associated with missing the original remediation timeframe.

As illustrated in FIG. 1, the one or more organization systems 10 generally comprise one or more communication interfaces 12, one or more processors 14, and one or more memories 16. The one or more processors 14 are operatively coupled to the one or more communication interfaces 12 and the one or more memories 16. As used herein, the term "processor" generally includes circuitry used for implementing the communication and/or logic functions of a particular system. For example, a processor 14 may include a digital signal processor, a microprocessor, and various analog-to-digital converters, digital-to-analog converters, and other support circuits and/or combinations of the foregoing. Control and signal processing functions of the system are allocated between these processors according to their respective capabilities. The one or more processors 14 may include functionality to operate one or more software programs based on computer-readable instructions 18 thereof, which may be stored in the one or more memories 16.

The one or more processors 14 use the one or more communication interfaces 12 to communicate with the network 2 and other components on the network 2, such as, but not limited to, the one or more network devices 20, the one or more third-party systems 30, or one or more other systems 40. As such, the one or more communication interfaces 12 generally comprise a wireless transceiver, modem, server, electrical connection, electrical circuit, or other component for communicating with other components on the network 2. The one or more communication interfaces 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memories 16, which in one embodiment includes the computer-readable instructions 18 of organization applications 17 (e.g., web-based applications, dedicated applications, specialized applications, or the like that are used to monitor, communicate with, and/or take actions with respect to the various network device hardware or software). In some embodiments, the one or more memories 16 include one or more data stores 19 for storing data related to the one or more organization systems 10, including, but not limited to, data created, accessed, and/or used by the one or more organization applications 17. The one or more organization applications 17 may be applications that are specifically used to monitor the network devices 20 and network applications 27, communicate with the network devices 20 and network applications 27, and take actions with respect to the network devices 20 and network applications 27 (e.g., remediate the vulnerabilities, allow for exceptions when requested, suppress the exceptions for reporting, and/or take consequence actions with respect to the network components, as will be described herein).

As illustrated in FIG. 1, users 4 may be associated with one or more of the network components (e.g., network devices 20, network applications 27, or the like). In some cases the users 4 may be the primary user associated with one or more network components, may be the user responsible for the one or more network components, or the like. Alternatively, in some cases the one or more network components may include user computer systems that allow the users 4 to communicate with and/or through the one or more organization systems 10. That is, in some cases, the users 4 may utilize the user computer systems to monitor the one or more network components (e.g., network devices 20, network applications 27, or the like) and/or take actions with respect to the one or more network components (e.g., network devices 20, network applications 27). Additionally, the user computer systems may also be considered one of the network components. As such, it should be understood that the one or more network components may be any type of device, such as a desktop, mobile device (e.g., laptop, smartphone device, PDA, tablet, watch, wearable device, or other mobile device), server, or any other type of system hardware that generally comprises one or more communication interfaces 22, one or more processors 24, and one or more memories 26, and/or applications used by any of the foregoing, such as web browsers applications, dedicated application, specialized applications, or parts thereof.

The one or more processors 24 are operatively coupled to the one or more communication interfaces 22, and the one or more memories 26. The one or more processors 24 use the one or more communication interfaces 22 to communicate with the network 2 and other components on the network 2, such as, but not limited to, the one or more organization systems 10, the one or more third-party systems 30, and/or the one or more other systems 40. As such, the one or more communication interfaces 22 generally comprise a wireless transceiver, modem, server, electrical connection, or other component for communicating with other components on the network 2. The one or more communication interfaces 22 may further include an interface that accepts one or more network interface cards, ports for connection of network components, Universal Serial Bus (USB) connectors and the like. Moreover, the one or more communication interfaces 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more network devices 20 may have computer-readable instructions 28 stored in the one or more memories 26, which in one embodiment includes the computer-readable instructions 28 for network device applications 27, such as dedicated applications (e.g., apps, applet, or the like), portions of dedicated applications, a web browser or other applications that allow the one or more network devices 20 to operate, that allow users 4 to take various actions using the network devices 20, or the like. For example, the users 4 may take actions with respect to one or more network devices 20, and/or may allow the users 4 to access applications located on other systems, or the like. In some embodiments, the users 4 utilize the one or more network devices 20 in the users daily operations and/or the users 4 may utilize the one or more network devices 20 (e.g., user computer systems) to interact with the organization systems 10, other one or more network devices 20 (or applications 27 thereof), the one or more third-party systems 30, and/or the one or more other systems 40.

As illustrated in FIG. 1, the one or more third-party systems 30 may communicate with the one or more organization systems 10 and/or the one or more network devices 20 directly or indirectly (e.g., through the organization). The one or more third party systems 30, and/or third-party applications thereof, may provide services for the one or more network devices 20 and/or the one or more organization systems 10. As such, the one or more third-party systems 30 are operatively coupled, via a network 2, to the one or more organization systems 10, the one or more network devices 20, and/or the other systems 40. The one or more third-party systems 30 generally comprise one or more communication interfaces 32, one or more processors 34, and one or more memories 36.

The one or more processors 34 are operatively coupled to the one or more communication interfaces 32, and the one or more memories 36. The one or more processors 34 use the one or more communication interfaces 32 to communicate with the network 2 and other components on the network 2, such as, but not limited to, the one or more organization systems 10, the one or more network devices 20, and/or the one or more other systems 40. As such, the one or more communication interfaces 32 generally comprise a wireless transceiver, modem, server, electrical connection, or other component for communicating with other components on the network 2. The one or more communication interfaces 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memories 36, which in some embodiments includes the computer-readable instructions 38 of one or more third party applications 37 that provide services to the one or more network devices 20 and/or the one or more organization systems 10. The access to the one or more third-party systems 30, or applications thereof, may be controlled by the one or more organization systems 10 and/or the one or more network devices 20, as will be described herein.

Moreover, as illustrated in FIG. 1, the one or more other systems 40 may be operatively coupled to the one or more organization systems 10, the one or more network devices 20, and/or the one or more third-party systems 30, through the network 2. The other like systems have features that are the same as or similar to the features described with respect to the one or more organization systems 10, the one or more network devices 20, and/or the one or more third-party systems 30 (e.g., one or more communication interfaces, one or more processors, and one or more memories with computer-readable instructions of one or more applications, one or more datastores, or the like). Thus, the one or more other systems 40 communicate with the one or more organization systems 10, the one or more network devices 20, the one or more third-party systems 30, and/or each other in same or similar way as previously described with respect to the organization systems 10, the network devices 20, and/or the third-party systems 30.

FIG. 2 illustrates a high level process flow for monitoring network components (e.g., network devices 20, network applications 27, combinations thereof, or the like), and suggesting remediation plans, identifying triggering for consequence actions for the network components, allowing for remediation exceptions, remediation suppression, and/or the like in response to identifying vulnerabilities with the network components. As illustrated in block 110 of FIG. 2, the primary user (e.g., owner assigned to the network component, administer, primary usage of the network components, and/or the like) of the network components may first be determined (e.g., identified from one or more systems of record, assigned based on the network component usage, assigned based on network component access, and/or the like). As will be described in further detail herein, the primary user may be determined by accessing one or more systems of record that store primary user details for the network components (e.g., network devices 20, network applications, or the like). It should be understood that if two or more systems of record conflict with each other, or do not include network component information regarding a primary user, the present invention may assign ownership to a user 4 based on the users 4 that access the network components, use the network components, network traffic for the network components, or otherwise users 4 that can be tied to the network elements through electronic data. It should be understood that the identification of the primary user 4 is described in further detail with respect to U.S. patent application Ser. No. 15/889,944 entitled "Network Device Owner Identification and Communication Triggering System" filed concurrently herewith, and which is incorporated by reference in its entirety herein.

Block 120 of FIG. 2 illustrates that the network components are monitored for vulnerabilities. It should be understood that vulnerabilities of network components may be any type of vulnerabilities, such as but not limited to, data security breaches, unauthorized access, data that has been copied, elements that do not utilize passwords, elements that do not utilize additional authentication factors, devices that include eavesdropping, malware, spyware, ransomware, Trojan horses, viruses, worms, rootkits, bootkits, keylogger, screen scrapers, backdoors, logic bombs, payloads, denial of services software, elements do not have up-to-date software, allows downloading of data onto external drives, do not utilize screen locks, timed locks, or other electronic locking, systems that do not scan incoming or outgoing data, does not comply with physical security (e.g., is not properly stored, has been removed without authorization), does not have location determination activated, have applications downloaded without authorization, interacts with restricted hardware or software, accessed unsecure websites (e.g., that do not use encryption, or do not use https URLs). It should be understood that the vulnerabilities may be universal vulnerabilities that are general to all organizations, and/or may be specific to the organization (e.g., specific policy vulnerabilities for the organization as a whole or for a specific subset of the organization, such as a line of business, group, or the like). As such, the vulnerabilities may be general outside vulnerabilities to the network components, or specific policies of the organization that a network component and/or user 4 thereof may be violating. It should be understood that the vulnerabilities being monitored may be set by the organization and/or may be set by the third-party providing the network components (e.g., providing the network devices 20 and/or applications thereof). As will be discussed in further detail herein, the network components may be monitored automatically by the organization systems 10 and/or user computer systems in order to determine any vulnerabilities. The monitoring of the network components will be discussed in further detail herein with respect to FIG. 3.

Block 130 of FIG. 2 illustrates that each of the vulnerabilities may have an associated remediation plan (e.g., a predetermined remediation plan, a plan developed based on the vulnerability, or the like). The proposed remediation plan may be suggested automatically based on the network elements, the user 4 associated with the network elements, the vulnerabilities, and/or the like, as will be discussed in further detail herein. The remediation plan suggested may include a notification to the primary user (e.g., owner, or the like) of the network component to remediate (e.g., mitigate, remove, reduce, or the like) the vulnerability identified. The remediation plan may also include process steps (e.g., a procedure for remediating the vulnerability), updates (e.g., software updates), links thereto, or the like that can be used by the user 4 (e.g., owner of the network component) to remediate the vulnerability. The notification may include a deadline for implementing the remediation. The suggestion of the remediation plan will be discussed in further detail herein with respect to U.S. patent application Ser. No. 15/889,797 entitled "Vulnerability Consequence Triggering System for Application Freeze and Removal" and filed concurrently herewith.

Block 140 of FIG. 2 further illustrates that a trigger may occur if the remediation plan of the network component is not followed. As such, there may be a triggering of a consequence action for the network component. In some embodiments, the network components (e.g., network device, network application, combination thereof) may be frozen, blocked, or otherwise restricted after a vulnerability is identified and/or if the user 4 does not implement the suggested remediation plan before a particular remediation deadline. That is, a user 4 (e.g., an owner, or other user 4 using the network components) may be prevented from using the network components (e.g., the network device, network application, application accessed through the network device, or the like) until the vulnerability is remediated. As will be discussed in further detail later, in some embodiments of the invention, if the remediation is not implemented, for example, before a particular remediation deadline, the network components may be removed (e.g., disconnected from the network, blocked, uninstalled, deactivated, or the like) as will be discussed in further detail herein.

Block 150 illustrates that in some embodiments, the user 4 may request a remediation exception, or an approval for resolving the vulnerability at a point in time after an original remediation timeframe. That is, the user 4 may request an exception to allow for the continuance of the identified vulnerability (e.g., unfreeze the network component and/or prevent removal of the network component even if the user 4 does not implement the remediation plan). For example, if the network component violates the organization policy, but is needed for a specific reason, the user 4 may request continued use of the network component with the vulnerability without implementing the remediation plan. It should be understood that the remediation exception request routing is described in further detail with respect to FIG. 3.

Block 160 of FIG. 2 illustrates that in some embodiments, in response to the remediation exception, reporting of the associated vulnerability for the network component may be suppressed in order to prevent the implementation of the remediation plan and/or consequence actions for the vulnerability. Suppression of the reporting, the remediation plan, and/or the consequence actions may occur when the user 4 requests an exception and it is granted, when a remediation suppression is automatically granted based on organization policy, or the like. As such, reporting of the vulnerability may be prevented in order to prevent false notifications of the vulnerabilities (e.g., prevent unneeded reporting of the vulnerability if the vulnerability has been allowed). It should be understood that while the reporting of the vulnerabilities may be suppressed, the remediation suppressions, vulnerabilities, users 4, and/or network components may still be monitored to make sure changes have not occurred that will change the suppression of the vulnerabilities, the remediation plan, and/or the consequence actions. For example, the organization policies may be monitored in order to make sure policy changes do not occur that would result in the removal of the remediation suppression (e.g., the remediation suppression is no longer valid and is rescinded). It should be understood that the remediation suppression for acceptable vulnerabilities is described in further detail with respect to U.S. patent application Ser. No. 15/889,789 entitled "Exception Remediation Acceptable Use Logic Platform" and filed concurrently herewith.

Additionally, or alternatively with respect to block 160, the present disclosure indicates that instead of or in addition to remediation suppression, customized criteria may be created and used to identify rolling network component exceptions that automatically prevent remediation of vulnerabilities for particular network components before the vulnerabilities are identified and remediation begins. It should be understood that the rolling network component exceptions are described in further detail with respect to U.S. patent application Ser. No. 15/889,799 entitled "Exception Remediation Logic Rolling Platform" filed concurrently herewith, which is incorporated by reference in its entirety herein.

FIG. 2 further illustrates in block 170 that monitoring and/or reporting of the triggering, remediation exception requests, and/or rolling exceptions or suppression for the vulnerabilities of the network components are continued until the network components are removed and/or the rolling exceptions or suppression are rescinded (e.g., no longer exceptions or suppression is no longer required due to remediation of the vulnerability, change in organization policies, or the like).

Referring now to FIG. 3, a flowchart is provided to illustrate one embodiment of a process 300 for exception remediation logic routing and suppression in accordance with embodiments of the invention. In some embodiments, the process 300 may include block 302, where the system identifies a vulnerability of a network component. As noted above, a vulnerability of the network component may be any type of vulnerability including, but not limited to, data security breaches, unauthorized access, elements within the network component that do not utilize additional authentication factors, denial of services software, elements of the network components that do not have up-to-date software, components that do not comply with physical security standards of the enterprise, components that do not comply with regulatory or legal standards, and the like.

The determination that a vulnerability is occurring may be made by the system itself, through a monitoring process of the network component. In other embodiments, the network component may self-report its vulnerability to the system in response to a security or vulnerability software application associated with the network component identifying the vulnerability. A user (e.g., a primary user), official, manager, or other individual may also report the vulnerability to the system.

When identifying the vulnerability of the network component, the system may additionally identify vulnerability information for the network component. This vulnerability information may include, for example, a vulnerability classification, a duration of time of the vulnerability, a remediation deadline, a lifecycle of the vulnerability, or the like. In some embodiments, the system may have access to a vulnerability database that provides at least some of the vulnerability information. For example, a vulnerability database generated, populated, and maintained by a managing entity may store classifications for each type of known vulnerability, expected or recommended remediation procedures for addressing each type of vulnerability, timeline information for each such remediation procedure, or the like. Additionally or alternatively, the system may identify or receive vulnerability information that includes, but is not limited to, a date and time that the vulnerability was identified, a date and time that the vulnerability began, one or more remediation procedure steps that have already been implemented, a remediation procedure that has already been agreed upon or otherwise begun, and the like.

Additionally, in some embodiments, the process 300 includes block 304, where the system identifies a vulnerability classification associated with the vulnerability of the network component. As used herein, a "vulnerability classification" refers to a rating, category, value, severity, impactful-ness, or other indicator of the gravity of an identified vulnerability, as it pertains to the network component, a business group associated with the network component, and/or the enterprise as a whole. In some embodiments, the vulnerability classification is determined or identified based in part on the other ongoing vulnerabilities, such that the vulnerability classification provides a priority ranking of this vulnerability as compared to the other vulnerabilities. In this way, the vulnerability classification enables the system, the primary user, and/or a specialist with information about the urgency for implementing a remediation procedure, the vulnerabilities that should be addressed first, and the like.

In some embodiments, the process 300 includes block 306, where the system identifies a primary user associated with the network component. Techniques for identifying the primary user, along with additional user information like communication information and employment information are described in more detail in U.S. patent application Ser. No. 15/889,944 entitled "Network Device Owner Identification and Communication Triggering System" and filed concurrently herewith. For example, the system may identify the primary user from a primary or secondary system of record that links each network component to one or more primary users. In other embodiments, the system may analyze network traffic data associated with the network component to identify a plurality of users that have interacted with the network component, and then determine a primary user from that plurality of users.

The process 300 may also include block 308, where the system identifies an original remediation procedure associated with the vulnerability of the network component, including an expected timeframe for completing the original remediation procedure. This original remediation procedure may be any set of steps designed or designated for the purpose of addressing, resolving, or otherwise mitigating the vulnerability. In some embodiments, the original remediation procedure may be the remediation referenced in block 130 of FIG. 2.

Each remediation procedure may have an acceptable or recommended timeframe or deadline for resolving a vulnerability. The expected timeframe for completing the original remediation procedure may, in some embodiments, be determined based on the vulnerability classification of the vulnerability of the network component. For example, the system may access a database of know vulnerabilities to match the current vulnerability of the network component with a stored timeframe, deadline, lifecycle, or other time-based requisite for resolving the vulnerability. This database may be establish, populated, and maintained by the managing entity or a third party that specializes in associating remediation deadlines or timeframes for a wide array of vulnerabilities that can be found across the enterprise.

The remediation deadlines or timeframes may be self-imposed internal timeframes for resolving a known vulnerability type, vulnerability ranking, or vulnerability classification that is based on business or efficiency purposes. Additionally or alternatively, the remediation deadlines may be based on laws, rules, or regulations imposed by a third party (e.g., an auditor, a financial institution), a non-governmental organization, a governmental organization, a regulatory organization, or the like. In other embodiments, the expected timeframe for completing the original remediation procedure is determined based on a service level agreement with a third party.

In some embodiments, multiple remediation step deadlines may be included in a remediation timeframe. As an example, the system may have identified a vulnerability of a server that is transmitting data to a separate server when that transfer of data should not be occurring. The system may determine a remediation procedure comprising at least two remediation steps of (1) stopping the transfer of data to the separate server and (2) fixing a bug that has been causing the transfer of the data so that the server can resume normal operations. The first deadline may have a shorter remediation step deadline than the second deadline, since the transfer of the data is a larger vulnerability issue than having a bug that could transfer data if the server is operating in a particular manner.

In this way, the original remediation procedure identified by the system allows the primary user to take a first action like taking the server at issue off-line to satisfy the first remediation step. The primary user may then fix the bug to satisfy the second remediation step before re-introducing the server back to the network. Therefore, when referencing a failure to meet a remediation timeframe or deadline, it should be known that the failure may be to meet a deadline of at least one remediation step even if one or more subsequent remediation steps could still be completed in time.

In some embodiments, the process 300 includes block 310, where the system determines that the expected timeframe for completing the original remediation procedure will not be met. Determining that the expected timeframe for completing the original remediation procedure will not be met may, in some embodiments, involve receiving an exception request from the primary user, or another individual or group with ownership privileges for the network component. This communication from the primary user may be responsive to a request from the system for information about the status of the original remediation procedure. Such an exception request may include information about the exception, a requested updated timeframe for the remediation process, a request for additional support in addressing the vulnerability, an indication that a different remediation process needs to be used, an indication that the network component should be taken off-line until the remediation process is completed, or the like.

In other embodiments, the system may monitor one or more of remediation process steps and determine that there is a low probability that the remediation timeframe will be met in time. For example, the system may access a database that lists known remediation process steps and average or minimum times to complete each remediation process step. If the average or minimum time for the primary user (or an average user) to complete a particular remediation process step, or the overall remediation process, is longer than the amount of time remaining for the remediation process timeline to be met, then the system can make the determination that the remediation timeframe will not be met in time.

Finally, the process 300 may continue to block 312, where the system generates a remediation exception procedure based on the vulnerability of the network component, the vulnerability classification, the primary user, or a line of business associated with the primary user, wherein the remediation exception procedure comprises an approval to implement the original remediation procedure outside of the expected timeframe for completing the original remediation procedure.

In general, the remediation exception procedure permits the primary user to complete the original remediation procedure even after the original remediation deadline has passed. As such, the remediation exception procedure may include instructions to one or more separate servers for suppressing any alerts that would be triggered in the event the vulnerability is not resolved within the original remediation timeframe.

This remediation exception procedure may comprise the original remediation procedure (i.e., the remaining steps of the original remediation procedure) and one or more additional remediation procedure steps that must be executed within an updated remediation timeframe. The updated remediation timeframe is a timeframe, deadline, multiple deadlines, or the like that extend to after the original remediation timeframe or deadline. The remediation exception timeframe may be requested by the primary user (e.g., as part of the request for the exception to the original remediation procedure, as a user input from the primary user after a prompt from the system for an updated remediation timeframe, or the like).

In other embodiments, the system may automatically determine the updated remediation timeframe based on other business rules, government or regulatory laws or regulations, or the like. For example, the original remediation timeframe may have been based on a business rule that allotted 3 months for a particular type of vulnerability to be resolved, however there may be a government regulation concerning the same vulnerability that requires complete remediation of the particular type of vulnerability in 6 months. Therefore, the system can determine that the original timeframe is a "soft" timeframe that does not put the network component in a non-compliant state until the 6 month deadline set by the government regulation. This later deadline can be added as the updated remediation timeframe that is associated with the remediation exception procedure of the network component.

In embodiments where the original remediation timeframe was a "hard" timeframe (i.e., the network component would be in violation of a law or would no longer be compliant with a rule or regulation), the system may need to take one or more additional measures to either put the network component in a compliant status as quickly as possible or to prevent the network component from being non-compliant once the "hard" timeframe has passed.

As such, the system may remove the network component from the enterprise network until the original remediation procedure has been successfully implemented. Removing the network component from the enterprise network may comprise unplugging the server or other computing device associated with the network component, converting the server or computing device to a non-production environment, or the like.

Furthermore, the system may be configured to establish a change freeze for the network component that prevents execution of one or more actions outside of a scope of the remediation exception procedure until the remediation exception procedure has been successfully implemented. For example, the system may lock every possible interaction with the network component or action that is executable on or by the network component except for a set of actions that are associated with the remediation exception procedure.

In some such embodiments, the system may further restrict the actions that may be taken on or by the network component by only permitting the actions or steps of the remediation exception procedure in a particular order (e.g., a first action of the remediation exception procedure is authorized at the exclusion of all other actions and, once the first action has been determined to be completed, the system authorizes a second action of the remediation exception procedure at the exclusion of all other actions—including the first action).

This solution is especially helpful when the system has determined that removing the network component from the production environment is not possible or is very difficult, and the network component can still operate without violating a law or regulation (or operate within an acceptable margin of error of the law or regulation).

In some embodiments, the system may restrict which users or devices are authorized to perform any actions on the network component until the vulnerability has been resolved. For example, the system may automatically restrict user or device interaction with the network component to the primary user, the computing device of the primary user, the business group of the primary user, a supervisor of the primary user, or the like.

The remediation exception procedure may be determined, approved, or otherwise generated based on a determination that the vulnerability is of a known vulnerability that can be resolved at some point up until the updated remediation deadline. Similarly, the vulnerability type may be informative on whether the requested exception remediation is authorized or not. In some embodiments, the system may analyze the primary user, the primary user's history in resolving vulnerabilities or in executing remediation procedures (e.g., average time to resolve a known vulnerability, success rate in resolving vulnerabilities within a certain period of time, or the like), or the same information with regard to the line of business of the primary user (e.g., average time for users in the same line of business as the primary user to resolve a vulnerability), or the like.

The remediation exception procedure and/or an approval for the remediation exception procedure may be compiled in a message or notification format and transmitted to a computing device associated with the primary user (e.g., a computing device associated with the primary user that is not the network component) to allow the primary user to receive any additional instructions, any updated remediation timeframe information, or the like in a timely manner. In this way, the system can automatically notify and inform the primary user of the new or adjusted steps or timelines associated with the overall remediation procedure of the vulnerability of the network component in real time to ensure that the vulnerability is addressed as quickly and effectively as possible.

Additionally or alternatively, any new remediation procedure steps that can be performed automatically by the system may be triggered, where the system transmits instructions, actions, messages, or the like to the network component to take the network component offline, to restrict access to the network component, to restrict available actions to or on the network component, or the like.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/889,789, now U.S. Publication No. 2019/0245878 | EXCEPTION REMEDIATION ACCEPTABLE USE LOGIC PLATFORM | Filed Concurrently Herewith |
| 15/889,797, now U.S. Publication No. 2019/0245879 | VULNERABILITY CONSEQUENCE TRIGGERING SYSTEM FOR APPLICATION FREEZE AND REMOVAL | Filed Concurrently Herewith |
| 15/889,944, now U.S. Publication No. 2019/0245871 | NETWORK DEVICE OWNER IDENTIFICATION AND COMMUNICATION TRIGGERING SYSTEM | Filed Concurrently Herewith |
| 15/889,799, now U.S. Publication No. 2019/0245880 | EXCEPTION REMEDIATION LOGIC ROLLING PLATFORM | Filed Concurrently Herewith |

What is claimed is:

1. A system for exception remediation logic routing and suppression, the system comprising:
    a memory device; and
    one or more processing devices operatively coupled to the memory device, wherein the one or more processing devices are configured to execute computer-readable program code to:
        identify a vulnerability of a network component;
        identify a vulnerability classification associated with the vulnerability of the network component;
        identify a primary user associated with the network component;
        identify an original remediation procedure associated with the vulnerability of the network component, including an expected timeframe for completing the original remediation procedure;

determine that the expected timeframe for completing the original remediation procedure will not be met; and generate a remediation exception procedure based on the vulnerability, the vulnerability classification, the primary user, or a line of business associated with the primary user, wherein the remediation exception procedure comprises an approval to implement the original remediation procedure outside of the expected timeframe for completing the original remediation procedure, and wherein the remediation exception procedure comprises removing the network component from an enterprise network until the original remediation procedure has been successfully implemented.

2. The system of claim 1, wherein the expected timeframe for completing the original remediation procedure is determined based on a vulnerability classification of the vulnerability of the network component.

3. The system of claim 1, wherein the expected timeframe for completing the original remediation procedure is determined based on a service level agreement with a third party.

4. The system of claim 1, wherein determining that the expected timeframe for completing the original remediation procedure will not be met comprises receiving an exception request from the primary user that includes an indication that the expected timeframe for completing at least a portion of the original remediation procedure will not be met.

5. The system of claim 1, wherein the remediation exception procedure comprises the original remediation procedure and one or more additional remediation procedure steps that must be executed within an updated remediation timeframe.

6. The system of claim 1, wherein the one or more processing devices are further configured to execute computer-readable program code to establish a change freeze for the network component that prevents execution of one or more actions outside of a scope of the remediation exception procedure until the remediation exception procedure has been successfully implemented.

7. The system of claim 1, wherein the one or more processing devices are further configured to execute computer-readable program code to transmit the remediation exception procedure to a computing device of the primary user.

8. The system of claim 1, wherein the computer readable instructions further comprise instructions for establishing a change freeze for the network component that prevents execution of one or more actions outside of a scope of the remediation exception procedure until the remediation exception procedure has been successfully implemented.

9. The system of claim 1, wherein the computer readable instructions further comprise instructions for transmitting the remediation exception procedure to a computing device of the primary user.

10. A computer program product for exception remediation logic routing and suppression, the computer program product comprising at least one non-transitory computer readable medium comprising computer readable instructions, the instructions comprising instructions for:
identifying a vulnerability of a network component;
identifying a vulnerability classification associated with the vulnerability of the network component;
identifying a primary user associated with the network component;
identifying an original remediation procedure associated with the vulnerability of the network component, including an expected timeframe for completing the original remediation procedure;
determining that the expected timeframe for completing the original remediation procedure will not be met; and
generating a remediation exception procedure based on the vulnerability, the vulnerability classification, the primary user, or a line of business associated with the primary user, wherein the remediation exception procedure comprises an approval to implement the original remediation procedure outside of the expected timeframe for completing the original remediation procedure, and wherein the remediation exception procedure comprises removing the network component from an enterprise network until the original remediation procedure has been successfully implemented.

11. The computer program product of claim 10, wherein the expected timeframe for completing the original remediation procedure is determined based on a vulnerability classification of the vulnerability of the network component.

12. The computer program product of claim 10, wherein the expected timeframe for completing the original remediation procedure is determined based on a service level agreement with a third party.

13. The computer program product of claim 10, wherein determining that the expected timeframe for completing the original remediation procedure will not be met comprises receiving an exception request from the primary user that includes an indication that the expected timeframe for completing at least a portion of the original remediation procedure will not be met.

14. The computer program product of claim 10, wherein the remediation exception procedure comprises the original remediation procedure and one or more additional remediation procedure steps that must be executed within an updated remediation timeframe.

15. A computer implemented method for exception remediation logic routing and suppression, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
identifying a vulnerability of a network component;
identifying a vulnerability classification associated with the vulnerability of the network component;
identifying a primary user associated with the network component;
identifying an original remediation procedure associated with the vulnerability of the network component, including an expected timeframe for completing the original remediation procedure;
determining that the expected timeframe for completing the original remediation procedure will not be met; and
generating a remediation exception procedure based on the vulnerability, the vulnerability classification, the primary user, or a line of business associated with the primary user, wherein the remediation exception procedure comprises an approval to implement the original remediation procedure outside of the expected timeframe for completing the original remediation procedure, and wherein the remediation exception procedure comprises removing the network component from an enterprise network until the original remediation procedure has been successfully implemented.

16. The computer implemented method of claim 15, wherein determining that the expected timeframe for completing the original remediation procedure will not be met comprises receiving an exception request from the primary user that includes an indication that the expected timeframe for completing at least a portion of the original remediation procedure will not be met.

17. The computer implemented method of claim 15, further comprising establishing a change freeze for the network component that prevents execution of one or more actions outside of a scope of the remediation exception procedure until the remediation exception procedure has been successfully implemented.

* * * * *